United States Patent
Savard

(10) Patent No.: US 11,761,681 B2
(45) Date of Patent: Sep. 19, 2023

(54) LIQUID-GAS HEAT EXCHANGER FOR USE IN A HEAT EXCHANGER SYSTEM USING SOLAR ENERGY

(71) Applicant: Gilles Savard, Jonquiere (CA)

(72) Inventor: Gilles Savard, Jonquiere (CA)

(*) Notice: Subject to any disclaimer, the term of this patent is extended or adjusted under 35 U.S.C. 154(b) by 47 days.

(21) Appl. No.: 17/964,197

(22) Filed: Oct. 12, 2022

(65) Prior Publication Data

US 2023/0030005 A1    Feb. 2, 2023

Related U.S. Application Data

(63) Continuation-in-part of application No. 15/281,314, filed on Sep. 30, 2016, now abandoned.

(51) Int. Cl.
| | |
|---|---|
| *F24S 10/30* | (2018.01) |
| *F24S 10/75* | (2018.01) |
| *F24S 10/70* | (2018.01) |

(52) U.S. Cl.
CPC .............. *F24S 10/30* (2018.05); *F24S 10/72* (2018.05); *F24S 10/755* (2018.05)

(58) Field of Classification Search
CPC ............ F24S 10/30; F24S 10/72; F24S 10/755
See application file for complete search history.

(56) References Cited

U.S. PATENT DOCUMENTS

2015/0184955 A1* 7/2015 Savard .................. F28F 13/12
165/85

* cited by examiner

*Primary Examiner* — Randy Boyer
*Assistant Examiner* — Juan C Valencia
(74) *Attorney, Agent, or Firm* — Christopher Pilling

(57) ABSTRACT

A liquid-gas heat exchanger for use in a heat exchange system using solar energy has an insulated chamber adapted to allow hot air to pass therethrough. A coil member extends through the insulated chamber and is adapted to allow a heat transfer liquid to pass into and then out of the insulated chamber. The spacing between the windings of the coil are predefined and the coil is in a predetermined position inside the insulated chamber, so as to force the air to pass in between the coil windings and increase the air contact with the coil and provide a large heat exchange. Several baffle members are placed each side of the coil member and an interior area of the insulated chamber and force air to circulate multiple times through the coil member, thereby allowing for an efficient exchange from the hot air to the heat transfer liquid. The insulated containe contains the heat exchanger which is comprised of a plurality of chambers, wherein each the plurality of chambers has a repeating pattern of shapes wherein each of the chamber of th plurality of chambers consists of one deflector which deflector being opposite to another deflector, which other deflector is a mirror image of its opposite deflector but shifted approximately half a the wall length. Each of the deflectors is defined by a specific sequence of components starting with a rounded wall from which extends a shear barrier and the wall is terminated by a diverter.

6 Claims, 7 Drawing Sheets

FIG. 2
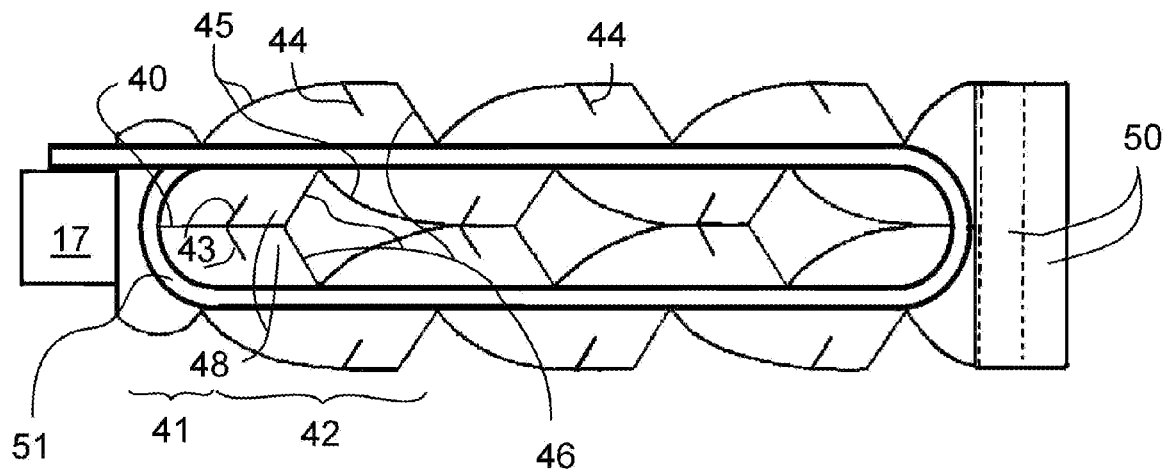
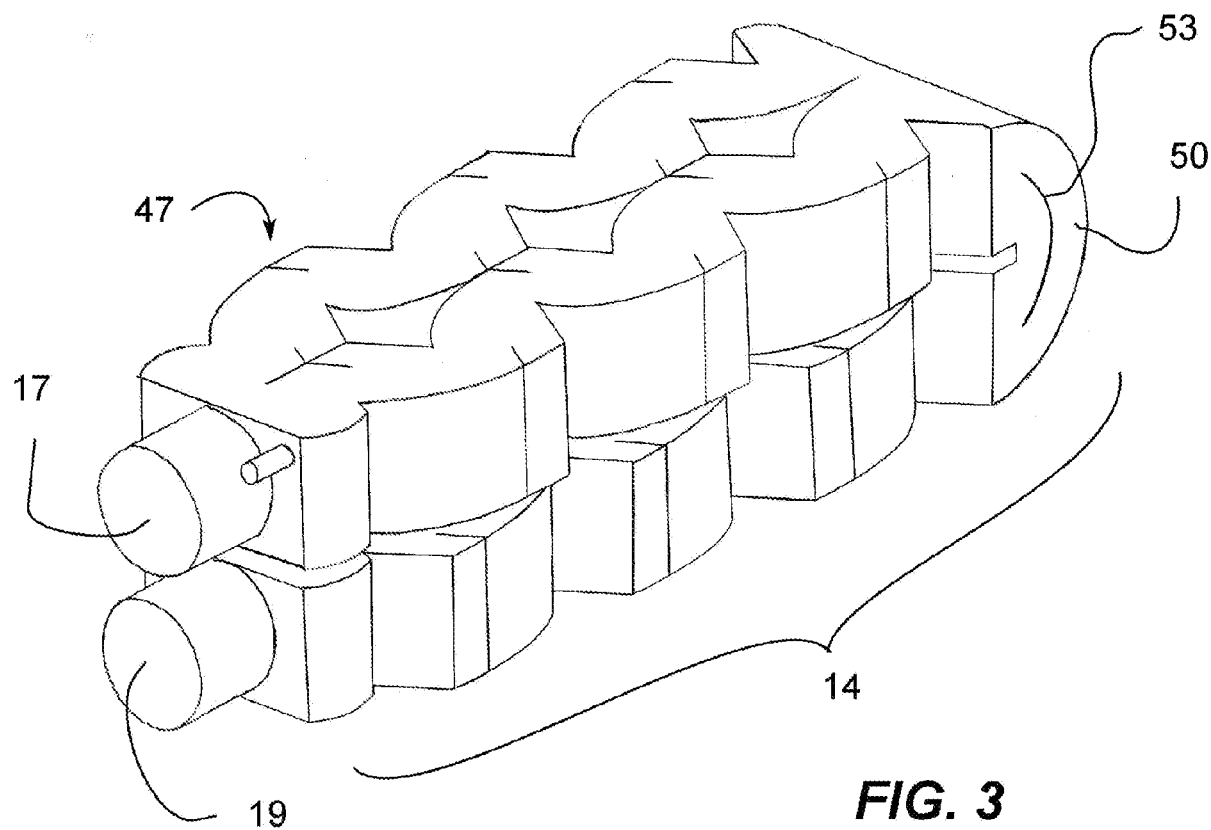
FIG. 3

LIQUID-GAS HEAT EXCHANGER FOR USE IN A HEAT EXCHANGER SYSTEM USING SOLAR ENERGY

CROSS-REFERENCE TO RELATED APPLICATIONS

The present application is a continuation in part of Application 15/281, 314 filed Sep. 30, 2016.

BACKGROUND OF THE INVENTION

1. Field of the Invention

The present invention relates generally to heat transfer but more particularly to a liquid-gas heat exchanger for use in a heat exchange system using solar energy.

2. Description of Related Art

Heat exchange is a well known process which is typically between similar fluids such as air to air and liquid to liquid. There are also systems that cool down liquids with air but very few systems are used for heating a liquid with air since water, for example, is 784 times denser than air and therefore requires a volume of air much higher than the volume of liquid in order to have an impact on heat exchange.

There are air-liquid heat exchange in the prior art such as Patent GB2085143 by Harris which describes an an air-liquid heat exchanger for use as an evaporator in, for example, a solar/ambient heat collecting heat pump has a cylindrical casing housing a coaxial coil or coils of helically wound finned or corrugated tubing in which liquid flows. A centrifugal impeller directs air axially into one end of the casing, and a baffle plate at the other end of the casing forces the air to flow radially outwardly through the coils before flowing axially through an annular outlet around the baffle plate, so that air flows over all the exposed surfaces of the coils. The casing may be transparent to enable the coils to absorb direct solar radiation and solar radiation reflected by a reflective element positioned externally of the casing.

There is also US 8,028,746 B2, by Cannas which describes a heat exchanger for a gas boiler for producing hot water is provided with a casing extending along a first axis and through which combustion fumes flow; a tube along which water flows, and which is housed inside the casing and coils about the first axis to form a helix made of a succession of turns; and deflecting means for directing the fumes between successive turns; the tube being provided with a first and a second fins, which extend along the length of the tube, face one another, and are tangent to the tube.

None of the prior art has all of the features and advantages of this instant invention.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a main object of the present disclosure to provide for a practical and economical way of having an air to liquid or even a liquid to air heat exchanger.

In order to do so, the present invention provides for an insulated chamber adapted to allow hot air to pass therethrough. A coil member extends through the insulated chamber and is adapted to allow a heat transfer liquid to pass into and then out of the insulated chamber. The spacing between the windings of the coil are predefined and the coil is in a predetermined position inside the insulated chamber, so as to force the air to pass in between the coil windings and increase the air contact with the coil and provide a large heat exchange. Several baffle members are placed each side of the coil member and an interior area of the insulated chamber and force air to circulate multiple times through the coil member, thereby allowing for an efficient exchange from the hot air to the heat transfer liquid The insulated chamber contains the heat exchanger which is comprised of a plurality of chambers, wherein each the plurality of chambers has a repeating pattern of shapes wherein each of the chamber of the plurality of chambers consists of one deflector which deflector being opposite to another deflector, which other deflector is a mirror image of its opposite deflector but shifted approximately half a the wall length. Each of the deflectors is defined by a specific sequence of components starting with a rounded wall from which extends a shear barrier and the wall is terminated by a diverter.

The diverter, along with the shear barrier, forms a low pressure zone which creates a vortex. A coil for carrying a liquid wherein the coil consists of a long winding pipe forming tube bundles passing through all of the plurality of chambers. The coil member includes a plurality of coiled sections to thereby increase the amount of heat transfer liquid inside the insulated chamber at any given time. In a preferred embodiment, the coil member are formed from metal tubing.

The insulated chamber is formed including insulating material chosen from a group of insulating material comprising rock wool, fiberglass, wood, high density polystyrene, and urethane.

In a preferred embodiment, the heat source is adapted to convert energy from a renewable clean energy source.

In a further preferred embodiment, the renewable clean heat energy source is formed as solar panels adapted to retrieve solar energy from the sun and heat the air inside the ducts.

The air heated within a thermal solar collector is pushed by a fan. The warmed up liquid can be stored inside a tank.

To achieve an optimum result of energy transfer, it was necessary to master two factors which control air flow: First achieve great turbulence, second efficiently and accurately steer the air stream traveling through the heat exchanger.

Turbulence is commonly observed in everyday phenomena such as surf, clouds, and smoke. Most flows occurring in nature and in engineering applications are turbulent. However, turbulence has long resisted physical analysis. Richard Feynman has described it as the most important unsolved problem of classical physics. However, creating turbulence is relatively easy to accomplish. What is difficult to attain is a high level of turbulence capable of thoroughly stirring a fluid, be it gas or liquid.

The configuration of the various elements composing the air-liquid heat exchanger and their positioning relative to each other combine to cause large-scale turbulence and repetitive along the path the air travels inside the heat exchanger.

The coil tubing has the primary function of circulating the liquid which absorbs the energy which is transferred by the colliding air molecules. The speed at which the air passes between the pipe winding which forms the coil contributes greatly to cause air turbulence.

The air is forced to cross the winding perpendicularly which reduces and divides the air flow into several small traffic areas. The total of these small surfaces being smaller than the chamber of the heat exchanger, the air is forced to reposition its molecules around obstacles to fit into these smaller spaces. The gap between the windings being smaller than what is required for the air to flow forces the air to increase its velocity.

Following the narrow passage, air once again reaches a larger area, which slows down its velocity and creates additional turbulence.

The first condition is inherent in the operation that the air must collide with the pipe to transfer its energy and therefore necessarily change direction on this occasion. This creates turbulence in the flow.

The second condition is the fact that for each pipe bundle, the positioning of each element is calculated and determined in relation to each other and, as a result, reduces the volume into which air can flow, which forces it to reposition itself in an extremely turbulent movement.

It is therefore the presence and the relational positioning of the winding, which creates turbulence by producing a sequential modification of the space available for the air to circulate.

To give a better perspective, the smallest prototype that was tested consists in a coil with 32 sections of pipe bundle, 128 segments of pipes, and 160 air gaps between these pipe sections and segments. Besides colliding with the coil, the repositioning between coil windings, the air also collides with the exchanger baffles. In a short path of about six feet in length, the air meets 496 obstacles forcing repositioning.

This efficiency to create repetitively and consistently high turbulence and cause multiple contacts and repeated air with the coil pipe contributes to the higher efficiency of the heat exchanger. No prior art offers such a density of turbulence nor such efficiency.

In this air-liquid heat exchanger, the same air repeatedly crosses several sections of the coil that contains the same water which heats up gradually as the energy contained in the air is transferred at each intersection of the air with the coil. At the end of the run, the air has yielded practically all of its energy, which results in the high efficiency of this invention.

To redirect the air flow to the coil, an original deflector was developed which consists in a rounded, or curved shape which ends with a diverter preceded by a shear barrier in an angle. This configuration helps to uniformly distribute the arrival of the flow of air molecules across the width of the coil. Thus, the molecules are well distributed, and energy transfer is also well distributed and uniform.

Many simulations as well as tests on prototypes have confirmed that in the absence of the shear barrier in an angle, the air stream moves in creating a greater pressure at one end of the coil which moved the air at a greater speed which resulted in a decline in overall efficiency of the energy transfer.

This double action deflector helps to increase the turbulence in the air stream in two ways. First by creating a deflection in the air stream, it necessarily causes the positional change of the molecules within the air stream, which creates turbulence. Secondly, when striking the shear barrier in an angle, as air passes besides the diverter, it creates a venturi effect which sucks air out of the inner low pressure zone - hence its name. Of course, when the pressure is too low, the fast moving air is diverted into the inner low pressure zone and enters to create a vortex which results in turbulence in the air flow.

The configuration and combination of the various components as well as the unique shape of the double action deflector creates a better control of certain phenomena such as turbulence, and the redirection of air produces a result much superior than any similar equipment from the prior art. Although the conceptual components are not new in themselves, since we do not reinvent any concepts, the new shapes, different assembly, combinations and presentation, as a whole, are new and unobvious. Common, obvious practice would have one create a series of randomly located baffles and obstructions to create turbulence and over several iterations from changing one parameter at a time, small incremental single digits improvement in stirring of a fluid could be obtained.

However, this liquid-gas heat exchanger was able to create a 10% improvement on a first prototype and, based on improvements, pushed the design further to bring up total efficiency improvement to 20%

These results were measured and validated by an independent engineering firm. Results could be obtained by going against general knowledge and practice in the field can only be the result of unobvious, originality and creativity It was concluded that series of repeating patterns would be better than a series of random located obstacles. Therefore, by using repeating simple forms, a more predictable result can be obtained no matter the number of variations in size and shape the heat transfer device needs to be.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 2 Cutaway top view of the exchange

FIG. 3 Isometric see through view of the exchanger.

DETAILED DESCRIPTION OF INVENTION

Figure 1:
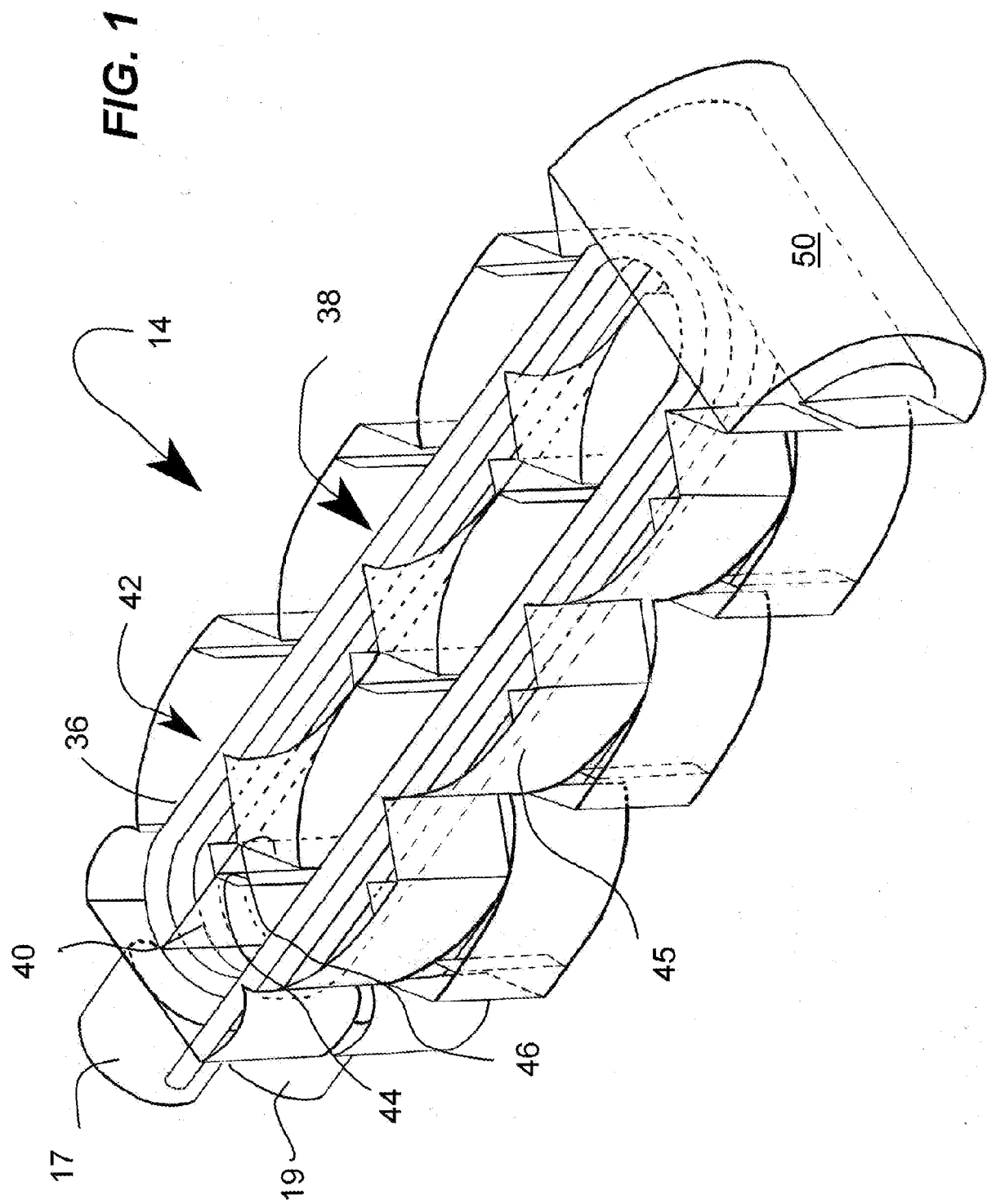
FIG. 1 Isometric view of the exchange
Figure 4:
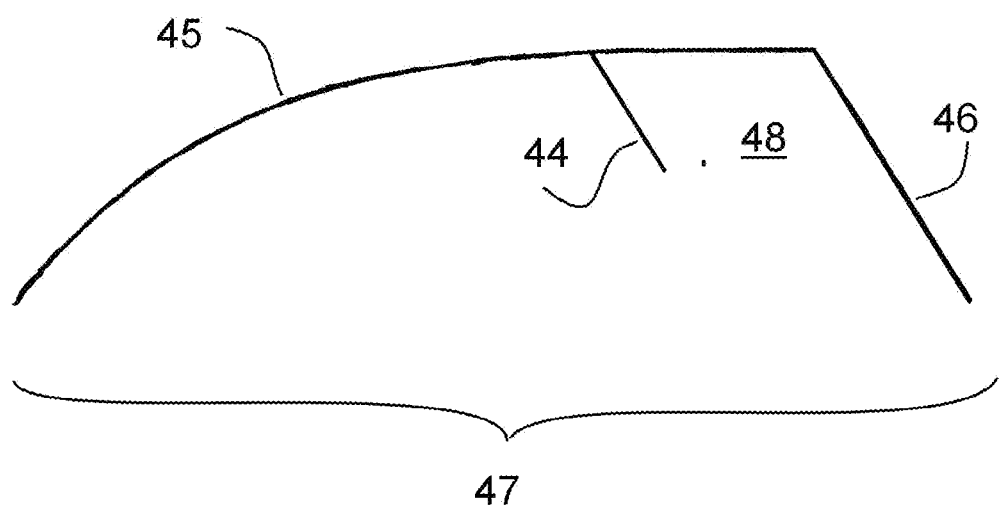
FIG. 4 Top view of the deflector
Figure 5:
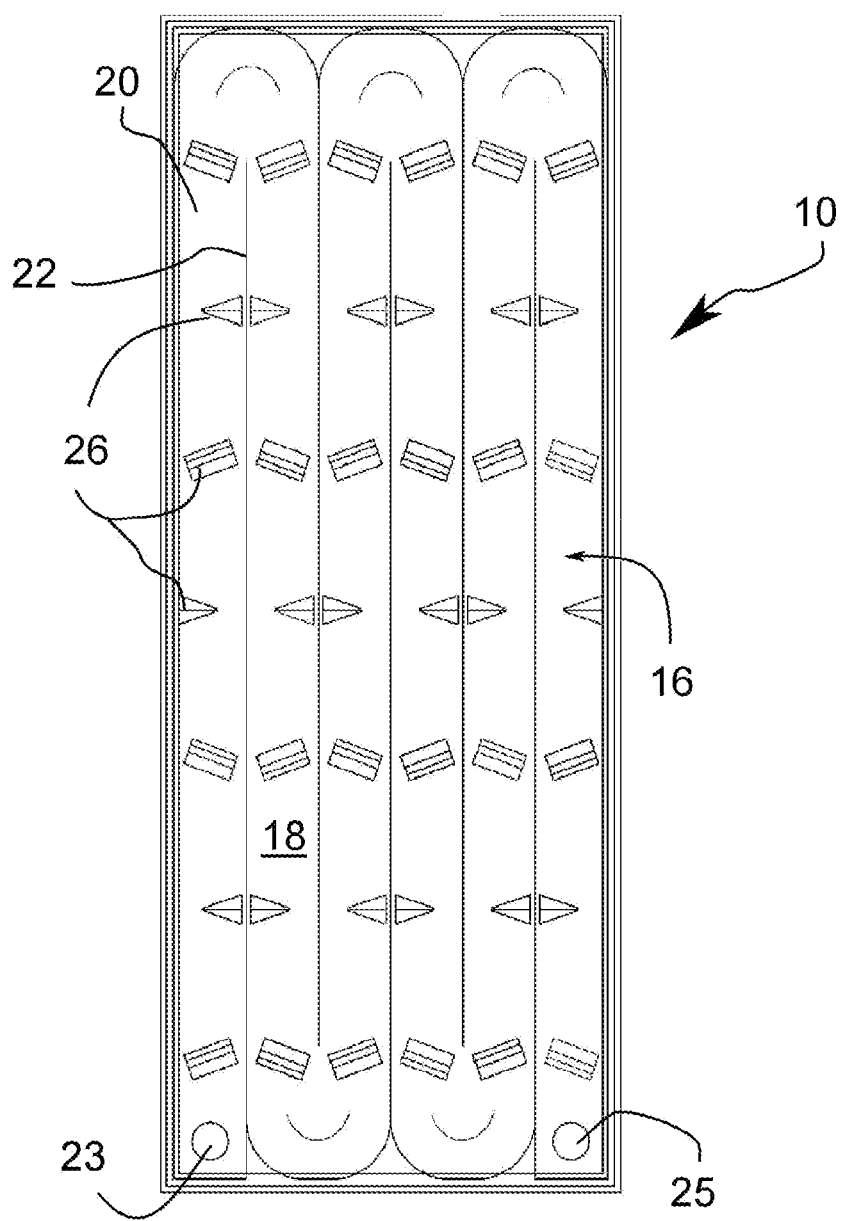
FIG. 5 Top view of the solar air-heater.
Figure 6:
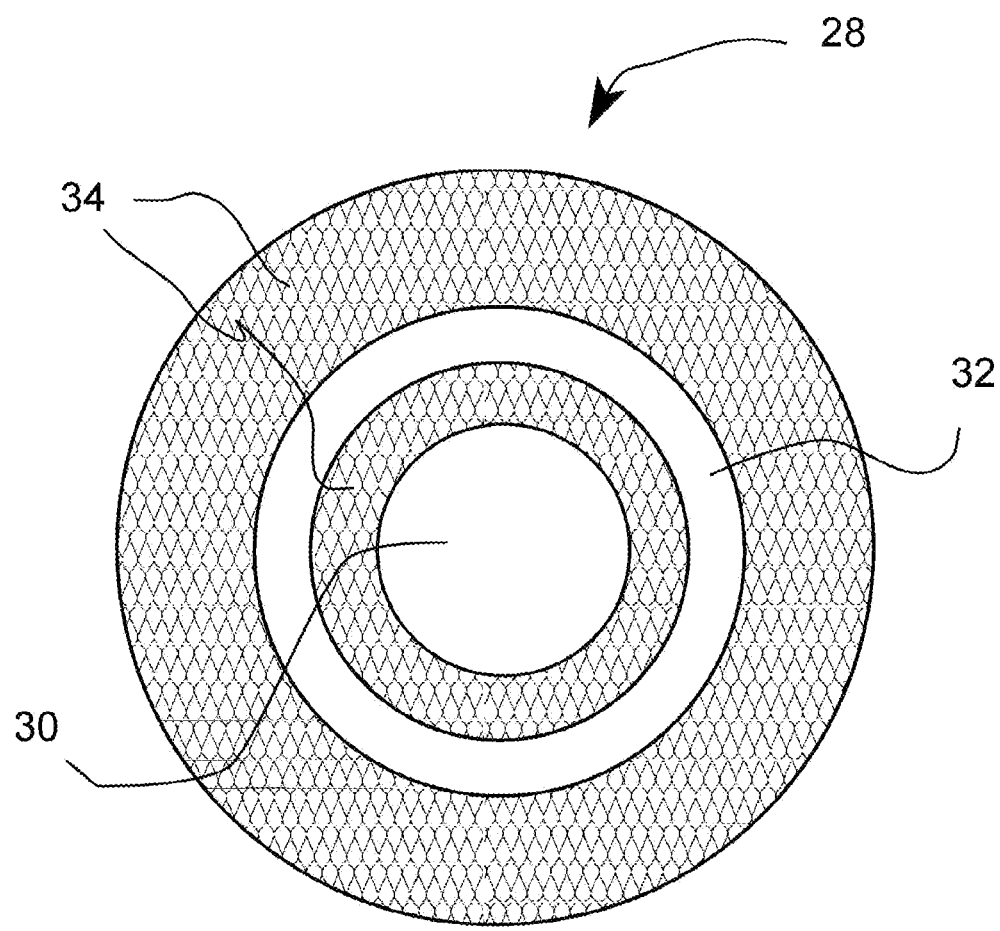
FIG. 6 Cutaway front view of the double pipe.
Figure 7:
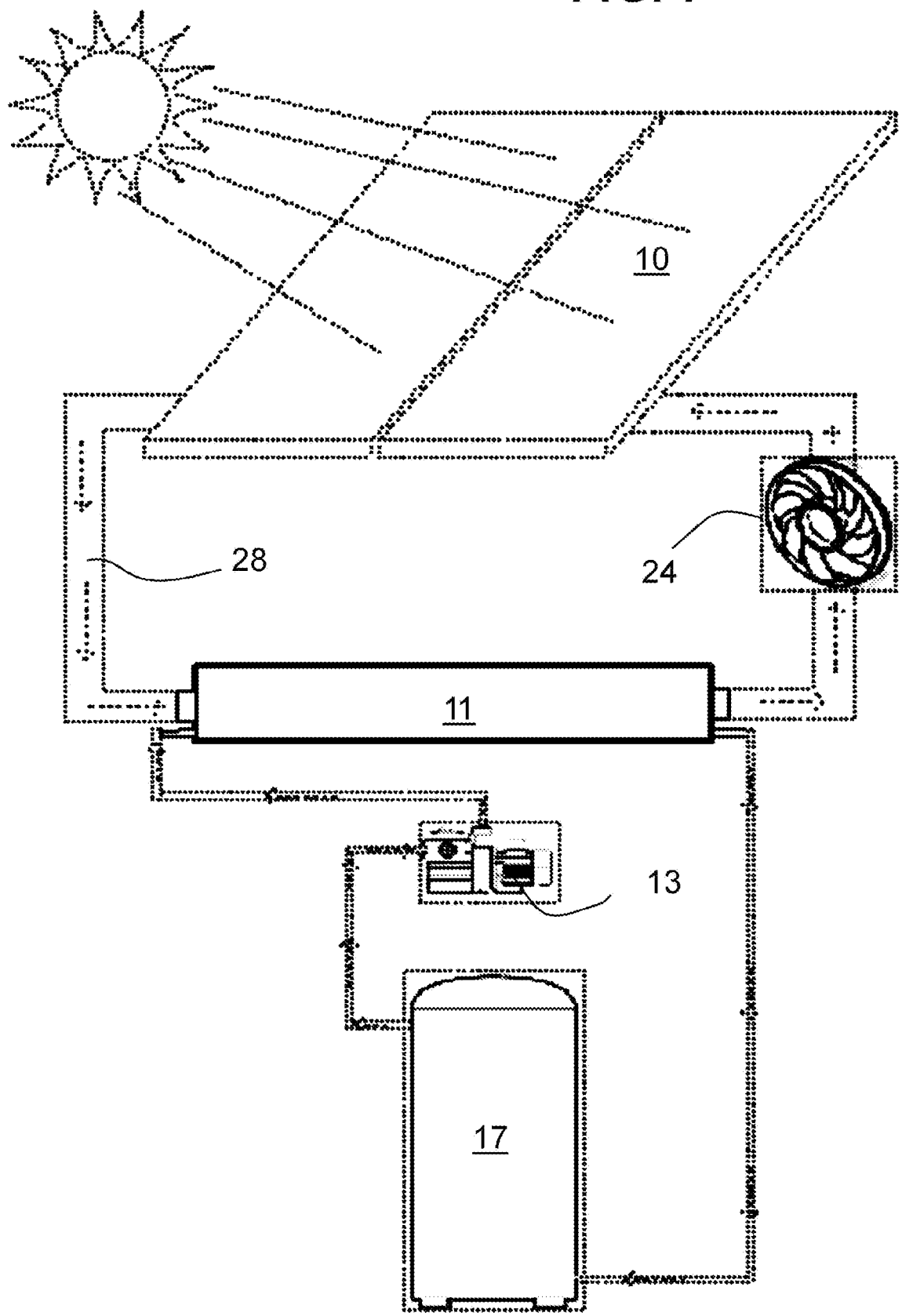
FIG. 7 Schematic view of the entire system.
Figure 8A:
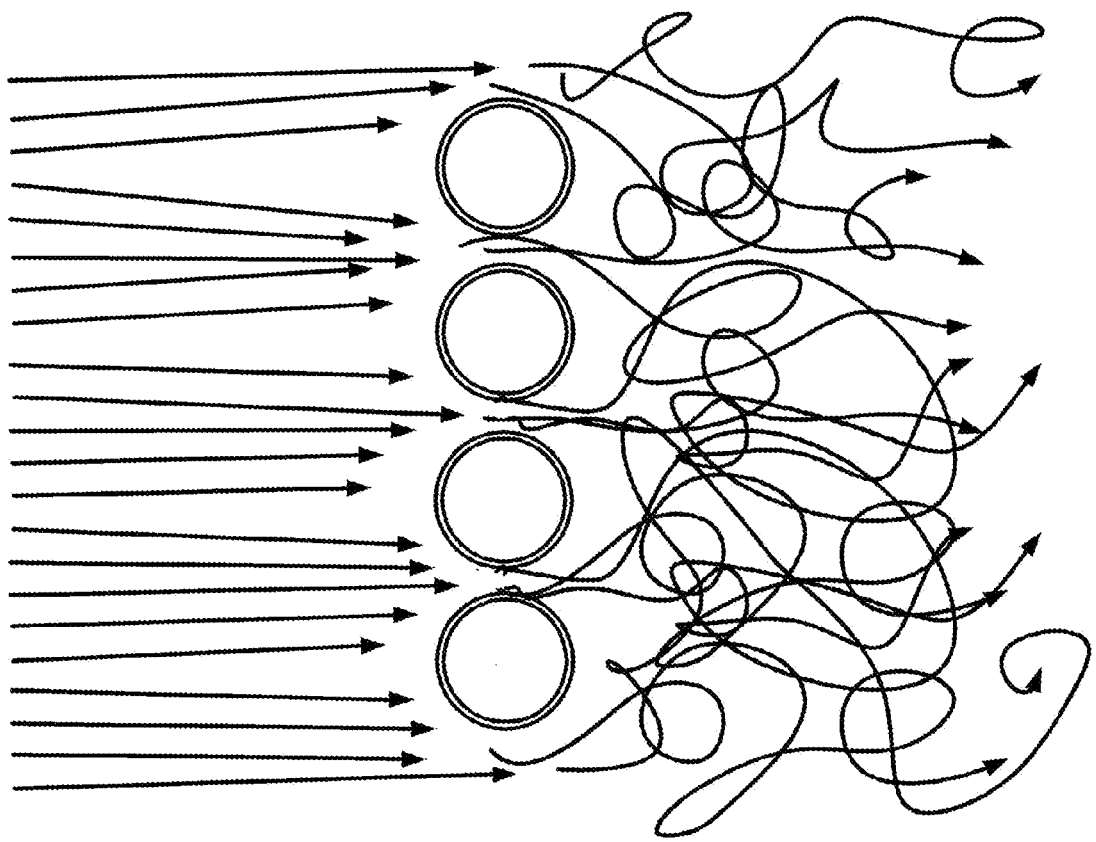
FIGS. 8A-B illustrate how the positioning and the presence of each coil tube bundle section is effective in causing a large amount of used air to come into turbulence.
Figure 8B:
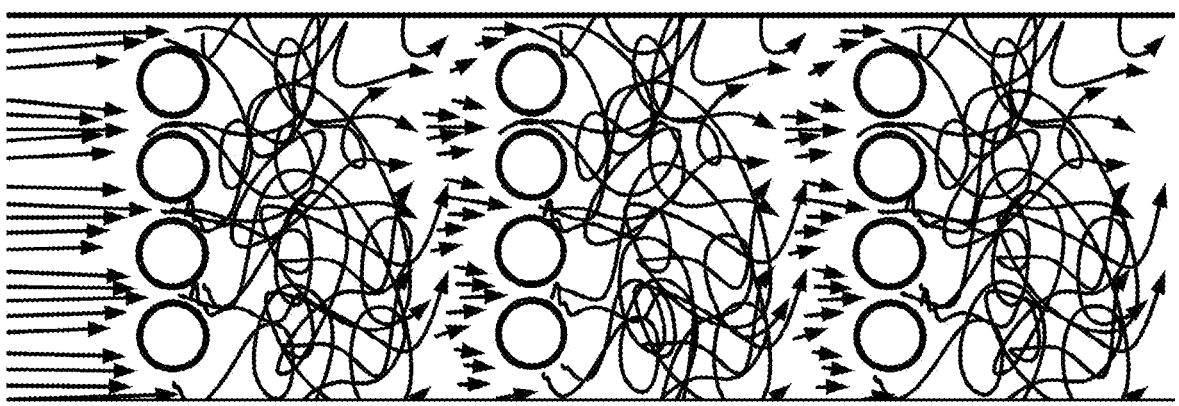

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein.

It is to be understood that the terminology used herein is for the purpose of describing particular embodiments only and is not intended to be limiting. The terms "a" or "an," as used herein, are defined as to mean "at least one". The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. The term "providing" is defined herein in its broadest sense, e.g., bringing/coming into physical existence, making available, and/or supplying to someone or something, in whole or in multiple parts at once or over a period of time. As used herein, the terms "about", "generally", or "approximately" apply to all numeric values, whether or not explicitly indicated. These terms generally refer to a range of numbers that one of skill in the art would consider near the stated amount by about 0%, 5%, or 10%, including increments therein. In many instances these terms may include numbers that are rounded to the nearest significant figure.

Referring now to any of the accompanying FIGURES, A heat exchanger system for use in liquid-gas heat exchange using solar energy is comprised of three (components: A solar heater panel (10), a double pipe (28), and a heat exchanger (14). Other components include a water pump (13) and a water tank (17), Except for the fact that it uses air instead of water, the solar air-heater panel (10), is similar to solar liquid-heater panels. Sunlight passes through a sheet of transparent glass (16) and heats up a back panel (18) painted a dark color so as to generate as much heat as possible. There is a single circuitous path (20) defined by wall members (22) that snakes across the panel (10). The air is forced, by way of a fan (24), pushing air into an entry (23), passing over a plurality of baffles (26) which mixes the air so that it is evenly warmed up with minimal temperature variations, and coming out at an exit point (25). The air-heater panel (10) doe not form part of this invention, it is just introduced here to show the general context of use of the invention.

The double pipe (28) consists in a small diameter inner pipe (30) that run inside an outer pipe (32). Both pipes (30, 32) are separated by a layer of insulating material (34). The outer pipe (32) also has a layer of insulating material (34) surrounding its exterior. The inner pipe (30) carries hot air coming from the solar air-heater panel (10), and the outer pipe (32) carries cooler air coming from the air-liquid heat exchanger (14). The double pipe (28) also does not form part of the invention and is shown here as an example of possible use in this context.

From the double pipe (28), the air moves, by way of an inlet (17), into the heat exchanger (14) which is located inside an insulated container (11). The air stream immediately enters an ante-chamber (41) where the air stream crosses a first tube bundle (51), is then divided by a divider (40) so that it travels in two separate parallel paths, wherein each path strikes an initial deflector (43) which directs the air stream into a chamber (42). In these chambers (42), the air stream interacts with a deflector (47) which is comprised of a curved wall (45), a shear barrier (44) and a diverter (46) located at the end of the curved wall (45). The air stream first crosses a section of tube bundle (36) along a curved wall (45). An inner low pressure zone (48) is located between the shear barrier (44) and the diverter (46) which forms part of the end of the deflector (47). As the air stream goes passing the deflector (47), it creates a venturi effect which sucks air out of the low pressure zone (48) (hence its name). Of course, when the pressure gets too low, the fast moving air enters into the low pressure zone to create a vortex which results in turbulence in the air flow The deviation of the air by the deflector (44), by ripple effect, produces a thrust on the air flowing closer to the coil (38). The overall effect is to uniformly distribute air across the width of the tube bundle (36). After passing between the tube bundle (36), the air stream continues into the next chamber (42). From there, the process is repeated with the air stream passing through the coil (38) with maximum turbulence.

The process is repeated in over 8 sections crossing the coil (38) until it hits the doubled up rounded section (50) which bring air into a next series of chambers (42).

During its travel in the new chamber (42), the air again crosses the coil (38) 8 times before it exits the heat exchanger (14) by way of an outlet(19) where the two parallel paths of air reunite and go back to the solar heater panel (10) to pick up heat before returning to the exchanger (14).

The flow of liquid inside the coil (38) starts at the bottom of the exchanger (14), where the heat of the air is low and ends at the top of the exchanger, (14) where the air is at its warmest.

In the case of heat transfer from air to liquid, with so much turbulence, each air molecule has a chance to make contact with the coil (38) and exchange its heat. In the case of transfer from hot liquid to air, the heat reaches each air molecule since they all make contact with the coil (38).

Air travel inside the exchanger (14) is measured in tenths of a second, which implies high speed and high volume of air. As long as there is an ample supply of hot air or that the available air can be heated up rapidly with a large array of solar heater panels (10) or other sources of hot air that can form as a result of some industrial process this exchanger (14) can be the solution for capturing heat and turning it into something useful that can be used in some other part of a given industrial process or even can be shared with a neighboring industry or factory.

The exchanger (14) as described hereinabove, is preferably surrounded on its six sides by the container (11) to reduce heat loss during the heat transfer operation, the container (11) does not form part of the invention and is shown here as an example of possible use in this context.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

The invention claimed is:

1. A heat exchanger comprising:
   an air inlet configured to enable air into the heat exchanger;
   a divider positioned adjacent to the inlet, the divider configured to divide the air into two separate air paths;
   a plurality of chambers provided along the two separate air paths;
   a liquid coil passing through each chamber of the plurality of chambers along the two separate air paths;
   each chamber of the plurality of chambers comprising a deflector having a curved wall forming a portion of the deflector; the deflector further comprising a shear barrier extending from the curved wall and a diverter forming an end portion of the deflector, wherein the shear barrier and the diverter such that as the air passes the deflector a vortex is created resulting in turbulent air flow providing uniformly distributed air across the liquid coil; and,
   an air outlet joining the two separate paths of air, wherein the air outlet is configured to enable the joined paths of air to exit the heat exchanger.

2. The heat exchanger of claim 1, wherein each chamber of the plurality of chambers along the two separate air paths are alternatively positioned in an offset image mirror position on each side of the liquid coil such that the air flow continually criss-crosses the liquid coil as the air travels from the air inlet to the air outlet.

3. The heat exchanger of claim 1, wherein a flow of liquid inside the liquid coil is configured to start at a point in the heat exchanger where an air temperature is at its lowest and the flow of liquid finishing where the air temperature is at its highest.

4. The heat exchanger of claim 1, wherein the air is heated by way of a solar heat panel.

5. The heat exchanger of claim 1, wherein the divider is configured to divide the air into two separate parallel paths.

6. The heat exchanger of claim 1, further comprising a doubled up rounded section, wherein the doubled round section is configured to bring the air into a second half of the plurality of chambers and the liquid coil.

* * * * *